(No Model.)
C. NELSON.
PROTECTOR FOR TOPS OF ICE CREAM CANS.
No. 527,711. Patented Oct. 16, 1894.
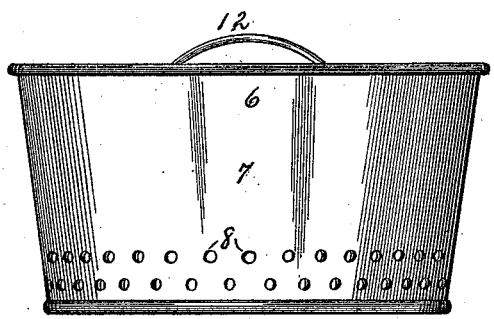
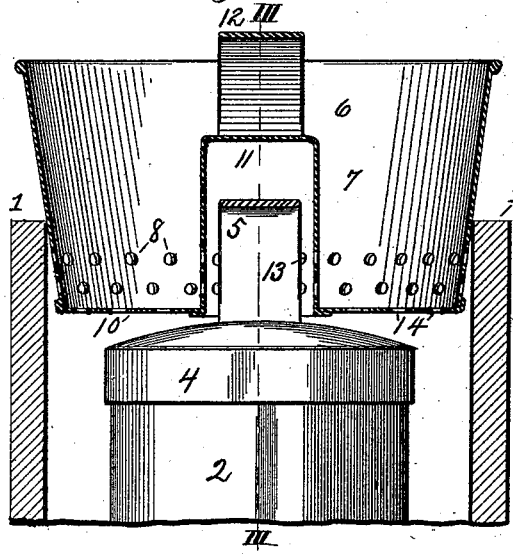
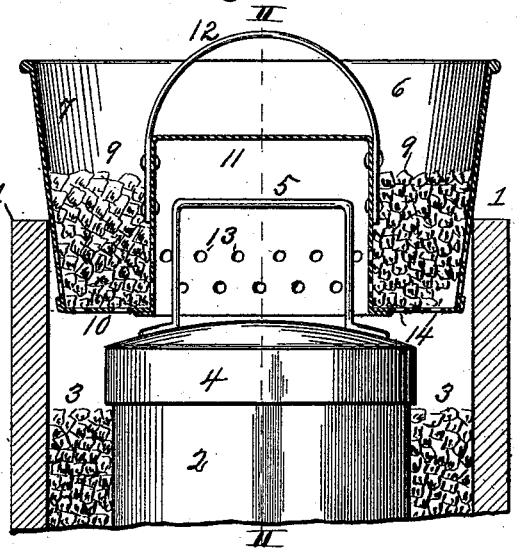
Attest:
A. M. Ebersole
E. S. Knight
Inventor:
Charles Nelson.
By Knight Bros.
atty's

UNITED STATES PATENT OFFICE.

CHARLES NELSON, OF ST. LOUIS, MISSOURI.

PROTECTOR FOR TOPS OF ICE-CREAM CANS.

SPECIFICATION forming part of Letters Patent No. 527,711, dated October 16, 1894.

Application filed May 21, 1894. Serial No. 511,968. (No model.)

*To all whom it may concern:*

Be it known that I, CHARLES NELSON, of the city of St. Louis, in the State of Missouri, have invented a certain new and useful Improvement in Protectors for the Tops of Ice-Cream Cans, of which the following is a full, clear, and exact description, reference being had to the accompanying drawings, forming part of this specification.

My invention relates to certain improvements in protectors for the tops of ice cream cans, and consists in a separate vessel adapted to fit in the top of the outer ice receptacle of an ice cream can in such manner, as to prevent warm air from coming in direct contact with the usual cover of the cream can, thus leaving the cover and handle of the can always clean instead of in the usual objectionable condition caused by heaping the loose and broken ice on the top of the lid to be removed therefrom each time, previous to removing the lid from the can, and again returning it after replacing the lid.

My invention consists in features of novelty hereinafter fully described and pointed out in the claim.

Figure I is a side elevation of my improved device. Fig. II is a vertical section taken on line II—II, Fig. III, the cream holding vessel being shown in elevation. Fig. III is a vertical section taken on line III—III, Fig. II.

Referring to the drawings, 1 represents the outer receptacle within which the cream holding vessel 2 is placed and suitably packed with ice or other suitable material 3, as shown in Fig. III. The vessel 2 is provided with a lid 4 having a handle 5.

6 represents a removable ice holding vessel which consists in a circular body 7 having in its lower portion perforations or openings 8 through which the cold air and moisture from the ice 9 packed therein, pass.

10 represents the bottom of the ice holding vessel near the center of which is provided a raised portion 11, adapted to pass over the handle 5 of the lid 4.

12 represents a handle secured to the upper end of the raised portion 11 by which the ice holding vessel may be lifted.

13 represents perforations formed in the lower part of the raised portion 11, and 14 represents perforations in the bottom of the ice holding vessel through which the cool air and moisture pass down direct onto the cream can lid, when the protector is in the position shown in Figs. II and III and the warm air from above thoroughly excluded therefrom. The upper part of the raised portion 11 is water tight thus preventing any drip coming in contact with the handle 5, so that when the ice holding tray is removed, this handle is left clean and dry.

With my improved device, the disagreeable task of removing the loose ice by hand from the top of the cream can and again replacing it after the lid has been returned, is avoided. The ice once placed in the vessel need not be removed therefrom but when it is desired to remove the lid from the cream can, the lid protecting tray containing the ice is readily lifted off by the handle provided on its upper end, and without inconvenience may be readily replaced.

I claim as my invention—

In a protector for the tops of ice cream cans, a separate ice holding vessel consisting of a body provided with perforations, a raised portion fitting over the can lid handle, and perforations in the side of said raised portion, through which the cold air passes to the ice cream can lid and a handle by which the vessel may be lifted.

CHARLES NELSON.

In presence of—
A. M. EBERSOLE,
E. S. KNIGHT.